Patented Dec. 20, 1938

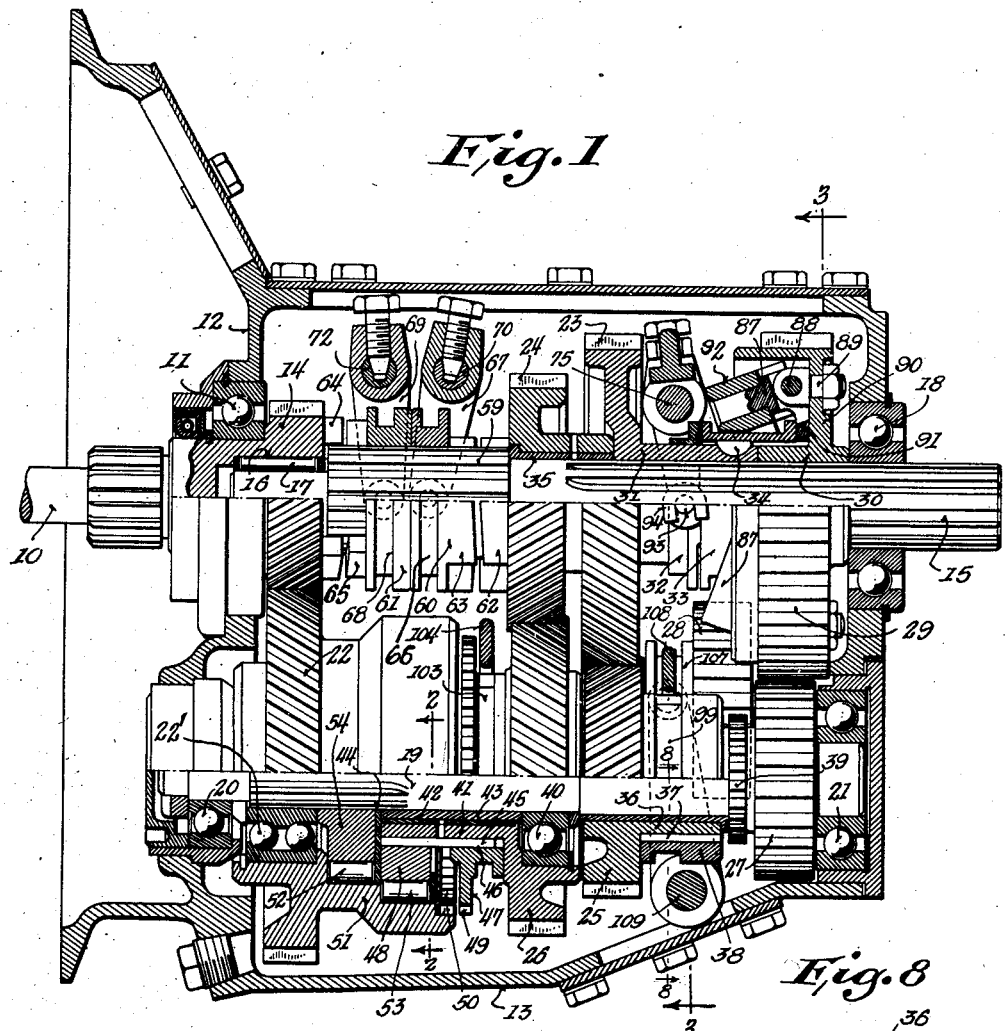
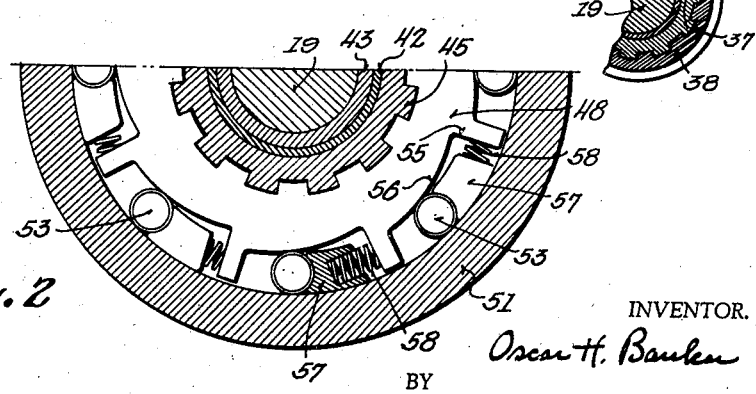

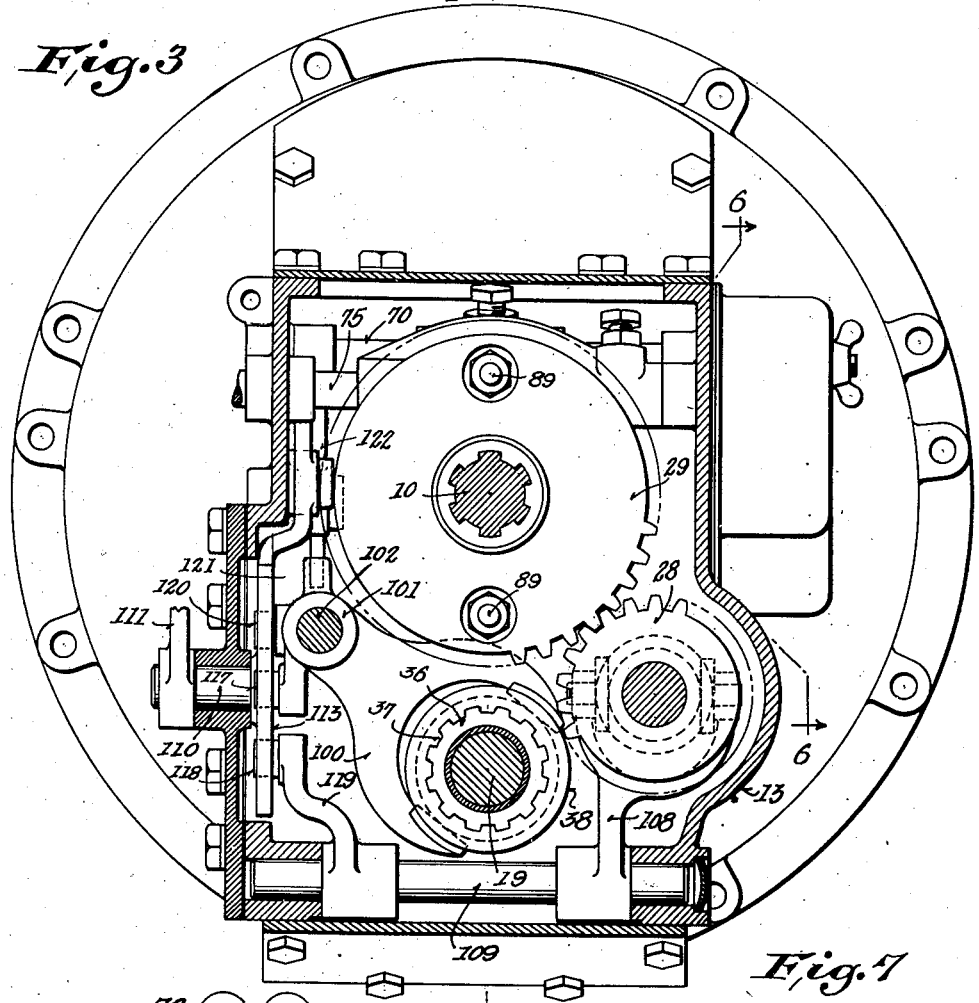
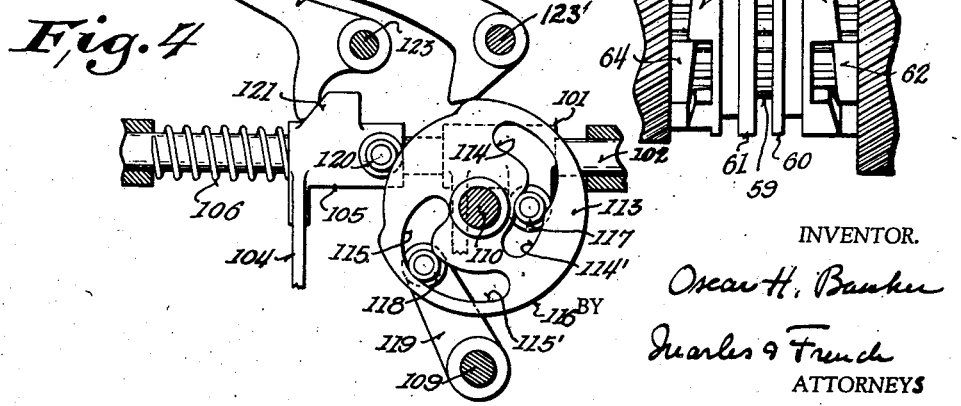

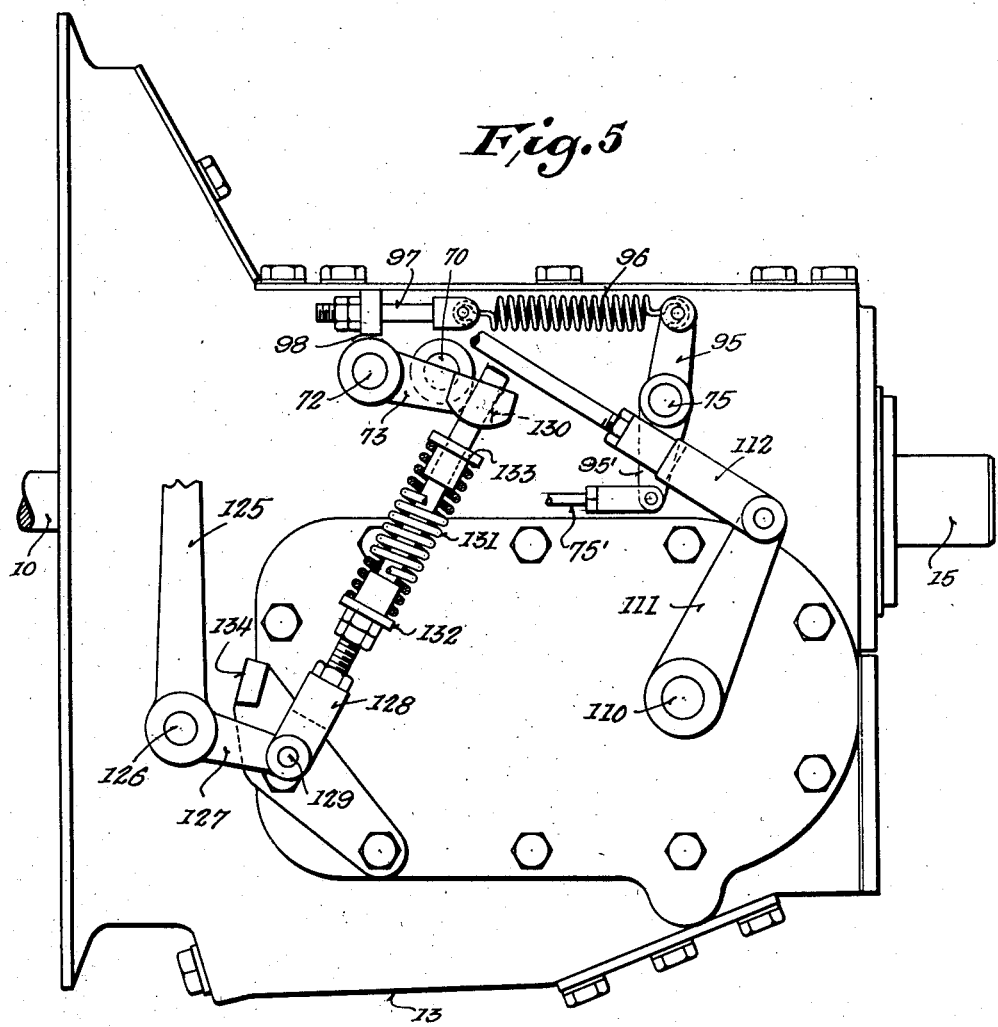

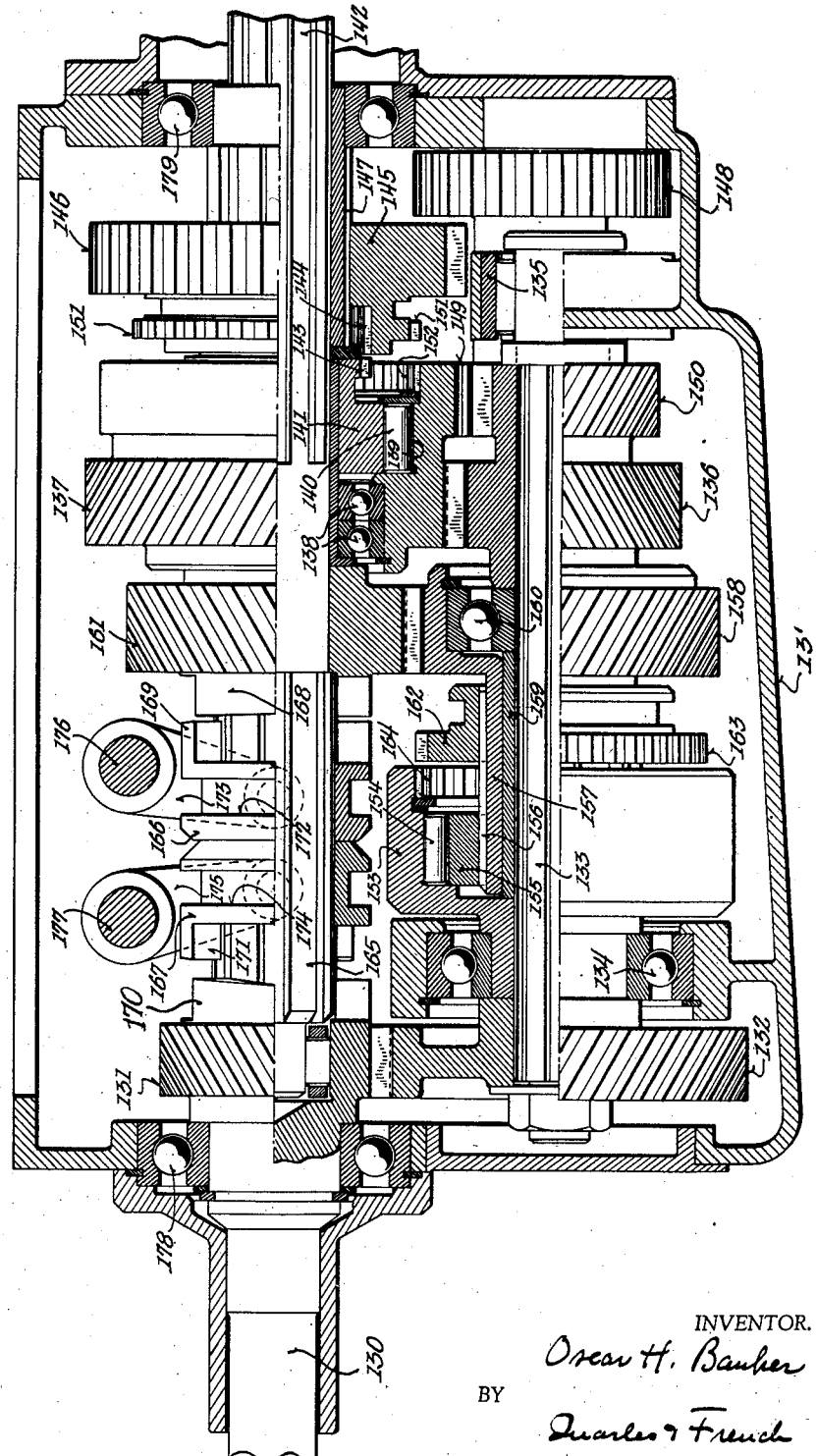

2,140,502

UNITED STATES PATENT OFFICE 2,140,502

CHANGE SPEED TRANSMISSION

Oscar H. Banker, Chicago, Ill., assignor to New Products Corporation, Chicago, Ill., a corporation of Delaware Application November 30, 1934, Serial No. 755,283

19 Claims. (Cl. 74—336.5)

The invention relates to change speed transmissions of the automatic type.

One of the objects of this invention is to provide certain improvements in the arrangement and construction of the parts of the device over that of my prior applications Serial No. 647,157, filed Dec. 14, 1932, which issued as Letters Patent No. 1,985,884, dated January 1, 1935, and Serial No. 658,747, filed Feb. 27, 1933, which issued as Letters Patent No. 2,012,296, dated August 27, 1935, said improvements having been developed to meet conditions met with in the actual operation of the device in an automotive vehicle operated by an ordinary driver.

A further object of this invention is to increase the safety and reliability of the mechanism by preventing shock or jolt through the engagement of one or more of the overrunning jaw clutches as where the operator coasts down a hill from stand still while the motor is disconnected or idling or when the operator returns from high to second and tries to go back to high gear without first accelerating his motor for driving in second gear. According to the present invention the jaw clutches are preferably arranged so that they are only partially disengaged under normal conditions so that while the driven shaft can drive through the clutches to the drive shaft, the drive shaft cannot drive the driven shaft through the clutches until an actual full engagement is effected. Also where both of the jaw clutches are adapted for partial disengagement as above described they act to prevent the vehicle rolling backwards when the same is on a hill and tends to roll down the hill backwards as under these conditions they lock the driven shaft against rotation.

A further object of the invention is to provide means for manually controlling the governor control shaft in case the governor is out of order or in case it is desired to put the transmission into high gear while the vehicle is standing still.

The invention further consists in the several features hereinafter set forth and more particularly defined by claims at the conclusion hereof.

In the drawings:

Fig. 1 is a vertical sectional view through a transmission embodying the invention, taken on the line 1—1 of Fig. 3;

Fig. 2 is a detail sectional view taken on the line 2—2 of Fig. 1;

Fig. 3 is a detail sectional view taken on the broken line 3—3 of Fig. 1;

Fig. 4 is a detail sectional view of certain of the parts of the control mechanism;

Fig. 5 is a side elevation view of a transmission embodying the invention, parts being broken away and parts being shown in section;

Fig. 6 is a detail sectional view taken on the line 6—6 of Fig. 3;

Fig. 7 is a detailed view of a portion of the clutches showing said parts in a release position;

Fig. 8 is a detail sectional view taken on the line 8—8 of Fig. 1;

Fig. 9 is a detail view similar to Fig. 1 showing certain modifications.

Referring to the drawings, the numeral 10 designates the transmission drive shaft which may be connected to the engine shaft through any suitable clutch mechanism, preferably one of the automatic type.

The shaft 10 is journalled in a ball bearing journal 11 mounted in the front wall 12 of the casing 13, said shaft having a gear 14 formed thereon or secured thereto.

A driven shaft 15 is coaxially arranged relative to the shaft 10 and has one end projecting into an axial bore 16 in the shaft 10 and journalled in roller bearings 17 mounted in said bore, and its other end portion is mounted in a ball bearing journal 18 mounted in the rear wall of the casing 13.

A lay or auxiliary shaft 19 is mounted in bearings 20 and 21 in the end walls of the casing and in parallel relation to the concentric shafts 10 and 15 and has a gear 22 journalled on a bearing 22' on it and meshing with the gear 14.

Spiral gears 23 and 24 are mounted on the shaft 15 and constantly mesh respectively with spiral gears 25 and 26 on the shaft 19, the gear 23 being of somewhat larger diameter than the gear 24 which in turn is somewhat larger in diameter than the gear 14.

With the above described gearing, low speed is obtained by driving through gears 14 and 22 to shaft 19 and then through gears 25 and 23 to the shaft 15; second speed by driving through gears 14 and 22 to gear 26 and through the gears 26 and 24 to the shaft 15; high speed by a direct drive connection between the shafts 10 and 15; and reverse through gears 14 and 22 to shaft 19 and through a gear 27 on shaft 19 adapted to mesh with a slidable back gear 28 which may also be brought into mesh with a gear 29 having its hub 30 splined on the shaft 15. It is to be noted that the reduction ratio between the gears 14 and 22 comprises the larger part of the reduction ratio of the gearing and that the reduction ratio between the gears 23, 25 and 24, 26 is small with the result that the speed of rotation of the gears 26 and 25 relative to the drive shaft will be low when the transmission is in its high gear ratio.

The hub portion 31 of the gear 23 is splined to the shaft 15 and provides a sleeve on which collar members 32 and 33 are slidably mounted, the collar member 33 being also keyed to the hub 31 by a key 34 and also slidably mounted relative to the hub 30 of the gear 29. The gear 24 has a bushing 35 that may turn freely on the shaft 15.

The gear 25 is loose on the shaft 19 and has a sleeve extension 36 which is splined to engage intermeshing splines 37 on a collar 38 shiftable relative to said extension, the splines 37 also adapted to engage the other clutch member 39 formed integral with or secured to the shaft 19. The collar 38 is shown in Fig. 1 in a neutral position, but may be shifted to establish the low gear ratio by its movement into intersplined relation with the clutch member 39, so that under these conditions the gear 25 becomes splined to the shaft 19.

The gear 26 is journalled at one portion on a ball bearing journal 40 interposed between its hub and the shaft 19 and has a sleeve extension 41 provided with a bushing 42 loosely journalled on a spacer sleeve 43 mounted on the shaft 19 between the inner race of the bearing 40 and a clutch roller retainer plate 44. The sleeve extension 41 is splined to provide teeth 45 which are adapted to inter-engage with splined portions on the hub 46 of a clutch member 47 and the hub portion of an actuator 48 of a one way clutch hereinafter described. The hub 46 of the clutch member 47 is slidably mounted on the splines 45 and has a peripherally toothed portion 49 which may be moved into engagement with a spline or intermeshing toothed portion 50 formed in the end of a sleeve 51 integral with and forming an extension of the hub of the gear 22. The clutch member 46 is adapted to be shifted to bring the clutch parts 49 and 50 into engagement to establish and maintain second gear ratio when desired. The sleeve 51 also forms a drum extension adapted to be engaged at different annular sections by sets of clutch rollers 52 and 53 of one way automatic clutches. The clutch rollers 52 engage the drum under the action of an actuator 54 keyed or splined to the shaft 19 and similar to the actuator 48 shown in detail in Fig. 2. The clutch rollers 53 engage the drum 51 under the action of the actuator 48 which as previously noted is splined or keyed to the hub 41 of the gear 26. Each set of the rollers 52 and 53 cooperate with their drums and actuators to form automatic clutches of known construction and, in connection with the actuator 48, Fig. 2 shows a detail of one of the clutches in which the rollers 53 work in recesses 55 having inclined surfaces 56 to wedge the said rollers against the drum 51 under relative movement of the drum and actuator in one direction and permit of the release of the rollers under relative movement of the drum and actuator in the opposite direction, a block 57 backed by a spring 58 normally acting to urge each roller 53 to a clutching position.

The gear 24 is adapted to be connected to the shaft 15 to establish the second speed gear ratio by speed responsive clutch mechanism and the gear 14 is adapted to be connected to the shaft 15 to establish the direct drive by speed responsive clutch mechanism, both of these clutch mechanisms being here shown as operated by the same speed responsive device.

The shaft 15 has a splined portion 59 upon which clutch members 60 and 61 are slidably splined. The gear 24 has a jaw clutch face 62 adapted to be engaged by a mating face 63 of the member 60 and the gear 14 has a jaw clutch face 64 adapted to be engaged by the mating face 65 of the member 61, the jaws of these clutch elements being of the type having inclined faces, so that they may slip past or overrun each other until conditions are right for engagement.

The clutch member 60 has an annular groove 66 in which the end portions of a shifter fork 67 are operatively disposed, and the clutch member 61 has a similar groove 68 in which the end portions of a shifter fork 69 are operatively disposed. The shifter fork 67 is mounted on a transversely disposed control shaft 70 journalled in the casing and at one end portion having a crank arm 71 secured thereto, see Fig. 6. The shifter fork 69 is secured to a transverse control shaft 72 journalled in the casing and having an exteriorly disposed crank arm 73 at one end and an exteriorly disposed crank arm 74 at its other end, see Figs. 5 and 6. The shafts 70 and 72 are connected for operation in each instance by a governor operated shaft 75. The shaft 75 has a bell crank lever 76 secured thereto, one of the arms of which has a yieldable spring link connection with the arm 71 of the shaft 70 and the other arm of which has a similar connection with the arm 74 of the shaft 72. The spring link connection first mentioned includes a rod 77 pivotally connected at 78 with the lever 76 and carrying a stop collar 79 against which the arm 71 is yieldingly pressed by a spring 80 surrounding said rod and interposed between said arm 71 and a nut 81 on the outer end of the rod. The connection for the arm 74 includes a rod 82 pivotally connected to the lever 76 at 83 and having a stop 84 at its outer end engaging the arm 74 which is yieldingly held thereagainst by a spring 85 interposed between said arm and a nut 86 adjustably mounted on the rod 82. With this construction when the shaft 75 is rotated or rocked clockwise as viewed in Fig. 6, the springs 80 and 85 will exert a yielding pressure against the arms 71 and 74 respectively and thus tend to rotate said arms and the shafts 70 and 72 connected therewith to shift the clutch members 60 and 61 away from each other.

The shaft 75, as previously noted, is operated through a speed responsive mechanism, and in Fig. 1 this mechanism is shown associated with the gear 29 on the driven shaft 15 and includes a plurality of weighted levers 87, each lever being pivotally mounted on a pin 88 carried by a bracket member 89 bolted to the web 90 of the gear 29. Each lever also has an arm 91 adapted to engage one end of the collar 33 and move the same toward the left, as viewed in Fig. 1, under the action of the weight 92 on the other arm of said lever. The collar 33 abuts against the flanged collar 32 which has diametrically disposed pins 93 thereon engaged by the forks of a shifter fork 94 secured to the shaft 75 which is mounted in the casing and has in addition to the lever 76 the exteriorly disposed lever arm 95 (Fig. 5) which is connected at its outer end by a spring 96 and a tension adjusting bolt 97 with a lug 98 on the casing.

The collar 38 has an annular groove 99 engaged by the arms of a shifter fork 100 having its end 101 slidably mounted on a shifter rod 102 mounted in and extending longitudinally of the casing at one side thereof, see Figs. 3 and 4.

The clutch member 47 has an annular groove 103 engaged by the arms of a shifter fork 104 having its end 105 slidably mounted on the shifter rod 102 and engaged by a spring 106 normally urging said fork toward the right as viewed in Fig. 4.

The shiftable reverse gear 28 has a collar 107 provided with a groove engaged by the arms of a shifter fork 108 mounted on an oscillatory shaft 109.

A main control shaft 110, that may be operated from the dash through connections including an arm 111 and link 112 as in my prior U. S. patents, for example, No. 1,843,194, dated Feb. 2, 1932, has a cam 113 (Fig. 4) mounted thereon provided with slots 114 and 115 and a peripheral portion 116. A roller 117 on the end 101 of fork 100 works in the slot 114 and a roller 118 on the free end of an arm 119 secured to the reverse shaft 109 works in the slot 115. The end 105 of the fork 104 has a roller 120 engaging the peripheral portion 116, and it also has a cam portion 121 engaging a latch 122 pivoted at 123 and adapted to be moved by said cam portion 121 into the position where the lug 124 on the shaft 72 forms a stop to engage said latch 122 and thus prevent movement of said shaft by the governor when the transmission is locked in second, Fig. 4 showing the parts in a neutral position. A second latch 122' is pivotally mounted on a shaft 123' and is adapted to engage the peripheral portion 116 of the cam 113 and when riding on the high portion thereof move into position adjacent the lugs 124 on the shafts 70 and 72. This occurs in the neutral and reverse positions of the gearing and prevents the clutch jaws 63 and 65 being forced into engaging positions when the car is being towed in neutral or being driven in reverse gear. The latches 122 and 122' are needed only when the jaws 63 and 65 are of a form normally out of engagement with their companion clutch jaws as shown in Fig. 1.

With the above construction of control, movement of the shaft 110 in a clockwise direction causes the cam slot 114 to act on the fork 101 so as to shift it toward the right as viewed in Fig. 1 and thus move the collar 38 into clutched engagement with the clutch member 39 to key the gear 25 to the shaft 19 for establishing forward low gear ratio and also through the high part of the cam portion 116 acts to thereafter, if desired, shift the fork 104 toward the left as viewed in Figs. 1 and 4 to bring the clutch parts 49 and 50 into engagement with each other to lock the transmission in second gear ratio. During these movements of the cam 113, the roller 118 rides in the dwell portion 115' of the slot 115 so that the lever 119 cannot be moved. On the movement of the shaft 110 in a counterclockwise direction from neutral position the roller 118 rides in the active portion of the slot 115 and acts to swing the lever 119 toward the right and thus shift the shaft 109 and the shifter fork 108 associated therewith toward the right to bring the gear 28 into engagement with the gears 27 and 29, and during this movement the roller 120 rides on the low part of the cam portion 116, so that the shifter fork 104 is not operated, and hence the clutch parts 49 and 50 are in disengaged position and the roller 117 rides in the dwell portion 114' of the slot 114 so that the shifter fork 100 is not operated and consequently the clutch parts 38 and 39 are in disengaged condition, and since both the high and second speed gearing of the transmission used in forward drive are loose, the drive during reverse will be from the shaft 10 through the gears 14 and 22 through the one way clutch including the rollers 52 to the shaft 19 and thence through gears 27, 28, and 29 to the shaft 15. When the parts are in neutral position as shown in Fig. 4, the latch 122' is in holding position and the latch 122 is in a release position and will remain in this position owing to the dwell portion of the cam 116 while the cam 113 is rotated to connect up the low speed clutch, but when the cam rotates to a position for locking in second, which means a shifting of the shifter fork 104, then the cam portion 121 of said fork will act on the latch 122 to move the same to a position just below the lug 124 of the shaft 72 and thus prevents the rotation of the shaft 72 so that the governor cannot act on said shaft and its associated clutch.

With the above construction the control shaft 110 is moved from its neutral position shown in Fig. 4 to a position in which the low ratio clutch 38, 39 is engaged. Then as the engine rotates the shaft 10 and the gear 14, the power will flow through the gear 14 to the gear 22 and through the one way clutch including the rollers 52 and actuator 54 to the shaft 19 and thence through the gear 25 then clutched thereto to the gear 23 and the shaft 15. As the speed of the vehicle increases, the increase in speed of the shaft 15 will at a predetermined value, such as five miles per hour car speed, cause the weights 92 to swing outwardly and through the lever arms 91 push the collars 33 and 32 toward the left as viewed in Fig. 1 and swing the shifter fork 94 toward the left and hence turn the shaft 75 in a clockwise direction and through the bell crank lever 76 and the springs 80 and 85 and lever arms 71 and 74 exert a similar turning tendency upon the shafts 70 and 72 which through their shifter forks 67 and 69 act to move the clutch members 60 and 61 away from each other and respectively toward the gear 24 and the gear 14 so as to bring the clutch face 63 into overrunning relationship with the clutch face 62 and the clutch face 65 into overrunning relationship with the clutch face 64. If then under these conditions the operator temporarily decelerates the speed of the drive shaft 10, then the speed of the gear 24 may be reduced temporarily, so that the clutch parts 62 and 63 will become synchronized and then be engaged and on again accelerating establish second speed relationship and under these conditions since the gear 23 is of larger diameter than the gear 24 it will revolve the gear 25 at a faster rate of speed than the gear 26 is revolving, so that the shaft 19 and the actuator 54 will revolve at a higher rate of speed than the drum 51 and hence the clutch rollers 52 will be released from said drum and the drive will then proceed from the gear 22 through the drum 51, rollers 53, actuator 48, hub 41, gears 26 and 24, clutch 62, 63 to the driven shaft 15. Thereafter as the speed of the driven shaft 15 further increases, the overrunning clutch jaws 65 and 64 may be made to engage by a second deceleration of the shaft 10, so as to synchronize these clutch parts with each other, so that they engage and upon acceleration of the drive shaft 10 the transmission is in high gear as under these conditions not only is the low speed roller clutch including rollers 52 overrunning, but since the gear 24 is of larger diameter than the gear 14, it will revolve the gear 26 at a faster rate of speed than the gear 22 is revolving, so that the actuator 48 will revolve at a higher rate of speed than the drum 51 and hence the rollers 53 will be released from said drum and the drive will then proceed from shaft 10 to the driven shaft 15 direct through the clutched engagement between the shafts 15 and 10. On a release of the clutch jaws 65 and 64, either by manual or governor operation, the second speed automatic clutch including the rollers 53 will again become operative and the transmission will be in second gear and then on a release of the clutch jaws 62, 63 the low speed automatic clutch including the rollers 52 will again become operative and the transmission will be in low gear. In order to permit release of the direct drive connection without waiting for the governor to react and consequently without changing the speed of the driven shaft 15 while proceeding in high, means are provided under the control of the operator for shifting the member 61 and its clutch face 65 out of operative engagement with the clutch member 64. For this purpose a pedal 125 is pivotally mounted at 126 on the case, only a part thereof being shown in Fig. 5, and is provided with an arm 127 to which one end of a link rod 128 is pivotally connected at 129, the other end of said rod slidably working through a slot 130 in the arm 73 on the shaft 72. The rod 128 has a spring 131 mounted thereon between an adjustable collar 132 and an end collar 133 which on the downward swinging movement of the pedal 125 is adapted to engage the free end of the arm 73 and through the spring 131 exert a yielding pressure thereon so as to put a similar pressure of limited amount on the shaft 72 to tend to rotate the same and thus move the jaw 65 out of operative engagement with the jaw 64. The actual operative disengagement of the two jaws is effected when the torque is temporarily broken or released as by a deceleration of the drive shaft 10. It is to be noted, however, from the detailed view of Fig. 7 that the jaw 65 is moved, so that it cannot be driven by the jaw 64 and hence by the engine, but the car will drive through the jaw 65 to the jaw 64 in case the motor tends to drop below car speed. This condition of the clutch is brought about by limiting the movement of the pedal 125 and hence the action of the spring 131 on the lever 73, so that the shaft will only be moved to such an extent as to bring the clutch parts 64 and 65 into the position shown in Fig. 7. Movement of the lever is limited as shown in Fig. 5 by a stop lug 134 adapted to be engaged by the arm 127 of the pedal 125. The clutch members 65 and 64 are not consequently completely disengaged so that the release of the pedal 125 by the operator, prior to acceleration in second gear, will permit an immediate re-establishment of high speed conditions without causing any damage.

The position of partial disengagement of the clutch member 65 through the operator's action of the pedal 125 is shown at the left hand portion of Fig. 7, and this positioning of this particular clutch element would occur in conjunction with the other features of the construction shown in Fig. 1 where the clutch member 65 is shown fully separated from the companion clutch member 64 when the parts are in a neutral position.

It is preferred to arrange both clutch members 63 and 65 so that in a so-called disengaged position they are partially engaged with their companion clutch members 64 and 62 as shown in Fig. 7 and they assume this position while in neutral or until the governor acts to fully engage them so that at no time is the driven shaft free of the driving shaft while the driving shaft may be free of the driven shaft. This has the effect of locking the vehicle against movement when it tends to roll down hill backwards and thus tends to turn the driven shaft 15 backwards. Under these conditions when the clutch 39, 38 is engaged, the differential action of the low and second speed gear sets previously described will tend to turn the overrunning clutches 52 and 53 backwards and lock gears 22 and 14 against the jaw clutches 63 and 65 which thereby lock the shaft 15 against rotation. With this arrangement for partial engagement shown in Fig. 7 the rods 77 and 82 with their stops 79 and 84 are adjusted relative to the lever 76 and the lock nuts 79' and 84' are tightened so that the clutch jaws are normally in the position shown in Fig. 7. Also because of this arrangement if the car is being coasted down the hill forwardly with the motor idling, the jaws being constantly in mesh, the gradual gain in momentum of the vehicle going down hill will keep the speed of the drive shaft 10 the same as that of the driven shaft 15, and consequently when the governor mechanism becomes effective, there will not be the sudden jolting engagement of the jaw clutches as would be the case if the jaws were out of engagement under these conditions.

In case the governor fails or the operator wants manual engagement of the jaw clutches when the car is standing still, the Bowden wire 75' under the operator's control is connected with an arm 95' on the shaft 75 so that the operator may move said shaft, and hence, through the springs 80 and 85, the shafts 70 and 72 to manually move the clutch members 63 and 65 to a position for engagement with their companion clutch members.

In the modification shown in Fig. 9 the general operation of the transmission is the same as that previously described but the one way roller clutch for the low speed gear ratio is associated with the driven shaft as is also the shiftable gear for reverse, and the governor mechanism may be a separate unit such as is fully shown and described in my copending application Serial No. 658,747 previously referred to. Briefly, the numeral 130 designates the drive shaft and 131 the gear thereon meshing with a gear 132 splined to the auxiliary shaft 133 which is mounted in bearings 134 and 135 inside the casing 13'. A gear 136 is keyed or splined to the shaft 133 and meshes with a gear 137 which is journalled on a ball bearing journal 138 and is connected to a one way roller clutch including a drum 139, formed by an extension of the hub of the gear 137, clutch rollers 140 and an actuator 141, similar to the actuator 48, and adapted to be connected to the driven shaft 142 by a jaw clutch including the toothed element 143 formed integral with said actuator 141 and an annular intermeshing toothed element 144 formed as a part of the hub of 145 of a shiftable gear 146. The gears 136 and 137 establish the low gear ratio through the overrunning clutch including rollers 140.

The shiftable gear 146 is slidably splined to a sleeve 147 which in turn is splined to the driven shaft 142 and said gear on reverse is shiftable into engagement with a reverse gear 148 mounted on a lay shaft journalled at one side of the shaft 133 and carrying a gear 149 meshing constantly with a gear 150 having a hub integral with that of the gear 136.

The gear 146 is shown in neutral position in Fig. 9 and on the first part of the forward movement, or movement toward the left, the clutch parts 143 and 144 engage, and thereafter further movement of said gear toward the left causes the transmission to be locked in low gear through the clutch connection of the jaw clutch parts 151 and 152, the part 151 being formed as a toothed element on the hub of the gear 146 and the part 152 being formed as internally toothed part adapted to intermesh or interspline with the toothed part 151.

The shaft 133 has a drum member 153 splined thereon and cooperating with the rollers 154 and actuator 155 of a one way automatic clutch, the actuator being similar in general construction to the previously described actuator 48, and having a key connection 156 with the extended hub 157 of one of the second speed gears 158 which is journailed on a sleeve 159 surrounding a portion of the shaft 133 also on a ball bearing 160 mounted between said shaft and gear. The gear 158 meshes with a gear 161 loosely mounted on the driven shaft 142 but adapted to be clutched thereto to establish second gear relationship.

For locking the transmission in second gear ratio a clutch member 162 is slidably keyed to the hub extension 157 of the gear 158 and has a toothed clutch element 163 adapted to mesh with an annular toothed clutch element 164 formed as a part of the drum member 153 so that, when these clutch parts 163 and 164 are engaged, the one way clutch is cut out and the drive proceeds direct from the shaft 133 to the gear 158.

The driven shaft 142 is mounted in the end of the drive shaft 130 in a manner similar to the mounting of the shaft 15 in the drive shaft 10 and has a splined portion 165 upon which clutch members 166 and 167 are slidably splined. The gear 161 has a jaw clutch face 168 adapted to be engaged by a mating face 169 of the member 166 and the gear 131 has a jaw clutch face 170 adapted to be engaged by the mating face 171 of the member 167, the jaws of these clutch elements being of the type having inclined faces so that they may slip past or overrun each other until conditions are right for engagement and the jaws 170 and 171 also preferably adapted to have the same association with each other under certain conditions of driving as the relation of the jaws 64 and 65, shown in Fig. 7.

The clutch member 166 has an annular groove 172 in which the end portions of a shifter fork 173 are operatively disposed and the clutch member 167 has a similar groove 174 in which the end portions of a shifter fork 175 are operatively disposed. The shifter forks 173 and 175 are mounted on shafts 176 and 177 which are similar to the shafts 70 and 72 of the first described construction and they may be controlled from speed responsive mechanism through a yieldable connection such as shown in Fig. 6 of the first described construction, these connections being operated from any suitable governor that is driven from a driven shaft of the transmission. One type of governor mechanism is specifically shown and described in the application Serial No. 658,747 previously referred to.

With this construction the operator shifts the gear 146 toward the left to bring the clutch parts 144 and 143 into engagement with each other for forward drive. Under these conditions power flows from the shaft 130 through the gears 131 and 132 to the shaft 133, and then through the gears 136 and 137, the overrunning clutch including the rollers 140 and actuator 141, through the clutch 143, 144, hub of the gear 146, and sleeve 147 to the driven shaft 142. As the speed increases the governor operates in the manner of the first described construction to move the clutch collars 166 and 167 away from each other and toward the mating clutch members 168 and 170 and into a position for engagement therewith. If then under these conditions the operator temporarily decelerates the speed of the drive shaft 130, then the speed of the gear 161 may be reduced temporarily so that the clutch parts 169 and 168 will become synchronized and be then engaged, and on again accelerating establish second speed relationship and under these conditions since the gear 137 is of larger diameter than the gears 161, it will rotate at a faster rate of speed than said gear and the gear 158 so that it will revolve faster than shaft 142 and hence the clutch rollers 140 will be released from the drum 139 and the drive will then proceed from the gear 132 through the drum 153, rollers 154, actuator 155, gears 158 and 161, clutch 168, 169 to the driven shaft 142. Thereafter as the speed of the driven shaft 142 further increases, the overrunning clutch jaws 171 and 170 may be made to engage by a second deceleration of the shaft 10 so as to synchronize these clutch parts with each other so that they engage, and upon acceleration of the drive shaft 10 the transmission is in high gear since under these conditions not only is the low speed roller clutch including the rollers 140 overrunning but since the gear 161 is of larger diameter than the gear 131, it will revolve the gear 158 at a faster rate of speed than the gear 132 is revolving so that the actuator 155 will revolve at a higher rate of speed than the drum 153 and hence the rollers 154 will be released from said drum and the drive will then proceed from the shaft 130 to the driven shaft 132 direct through the clutched engagement between the shaft 130 and 142. On a release of the clutch jaws 170 and 171, either by manual or governor operation, the second speed automatic clutch including the rollers 154 will again become operative and the transmission will be in second gear and then on the release of the clutch jaws 160 and 169 the low speed automatic clutch including the rollers 140 will again become operative and the transmission will be in low gear.

If under conditions of forward drive, the operator desires to maintain low gear relationship, the gear member 146 may be shifted further toward the left to establish the clutch connection between the parts 151 and 152. If it is desired to maintain the second gear relationship, the clutch member 162 is shifted to bring the clutch parts 163 and 164 into intermeshing relationship. It will be noted that in each of these instances the clutching of the parts as above described respectively locks out the overrunning clutches including respectively the rollers 140 and 154.

For reversing the vehicle the gear member 146 is shifted toward the right from the neutral position shown in Fig. 9 to mesh with the gear 148, and the drive then proceeds from the shaft 130 through gears 131 and 132 to the shaft 133, gears 150 and 149 to a lay shaft carrying the gear 148 which then meshes with the gear 146 that is splined through the sleeve 147 to the driven shaft 142. The splined shafts 139 and 141 are here shown as supported in the case by journal bearings 178 and 179.

While the successive engagement of the overrunning jaw clutches has been described, it is to be noted that when at ten miles an hour or less, according to the setting of the centrifugal governor, the operator decelerates for shifting the jaw clutches 62 or 168 and 63 or 169 will during a period of dwell of one or two seconds synchronize and engage and then without accelerating and for a similar period of dwell of one or two seconds the clutch jaws 64 or 170 and 65 or 171 engage, thereby enabling the driver to jump from low to high gear ratio without having to accelerate in second gear.

What I claim as my invention is:

1. In a change speed transmission, the combination of a drive shaft, a driven shaft, automatically variable change speed mechanism for changing the drive of the driven shaft from lower gear ratio to "high" on a temporary reduction in speed of the drive shaft below that of the driven shaft and means under the control of the operator to immediately put said change speed mechanism in a lower gear ratio without reducing the speed of the driven shaft when in "high", said driven shaft adapted while in the lower gear ratio to drive the drive shaft if the speed of said drive shaft falls below that of the driven shaft.

2. In a change speed transmission, the combination of a drive shaft, a driven shaft, automatically variable change speed mechanism for progressively changing the gear ratios between the drive and driven shafts from "low" to "direct" drive, means to immediately render said change speed mechanism ineffective to maintain said mechanism in "direct" drive and put said mechanism in a lower gear ratio without reducing the speed of the driven shaft when in "direct" drive; said driven shaft adapted while in the lower gear ratio to drive the drive shaft if the speed of said drive shaft falls below that of the driven shaft.

3. In a variable speed transmission, the combination of a drive shaft, a driven shaft, speed responsive actuated clutch mechanism for connecting said shafts together for direct drive on a temporary reduction in speed of the drive shaft below that of the driven shaft and having a driving connection from said driven shaft to said drive shaft on a release of said direct drive connection, change speed gearing between said shafts for connecting said shafts together at a different gear ratio, and manually operated means for moving said clutch mechanism for a release of the direct drive connection from said drive shaft to said driven shaft without releasing the driving connection from said driven shaft to said drive shaft.

4. In a variable speed transmission, the combination of a drive shaft, a driven shaft alined with said drive shaft, an auxiliary shaft, change speed gearing connecting said shafts together for low and second speed gear ratios, a free wheeling connection between said low speed gearing and said driven shaft, a free wheeling connection for said second gear ratio, speed responsive clutch mechanism for establishing second speed ratio through said gearing, speed responsive clutch mechanism for connecting said drive and driven shafts together for direct drive, said clutch mechanisms adapted to overrun when the speed of the driver exceeds that of the driven part being engaged but being constantly engaged for the drive of the driver part by the driven part and acting with said gearing and connections to lock the driven shaft against backward movement.

5. In a variable speed transmission, the combination of a drive shaft, a driven shaft, an auxiliary shaft, change speed reduction gearing between said shafts, reverse gearing between said auxiliary and driven shafts including a gear on the driven shaft, automatic clutch mechanism of the overrunning type for establishing the reduced gear ratio, automatic clutch mechanism of the overrunning type for direct connection of said drive and driven shafts, and governor mechanism mounted on the reverse gear on said driven shaft and operatively connected to said clutch mechanisms to move them to a position for engagement.

6. In a variable speed transmission, the combination of a drive shaft, a driven shaft, an auxiliary shaft, change speed gearing between said shafts for low and second speed gear ratio and a reverse gearing connection between said auxiliary and driven shafts including a shiftable gear, automatic clutch mechanism for establishing second gear ratio, clutch mechanism for connecting said gearing for the low gear ratio, manually operated clutch mechanism for locking said gearing in second, and control mechanism for moving said shiftable reverse gear to "reverse" position while preventing operation of said low gear connecting clutch mechanism and said second gear locking clutch mechanism.

7. In a variable speed transmission, the combination of a drive shaft, a driven shaft, change speed gearing between said shafts, an overrunning jaw clutch for establishing connection between said shafts through said gearing, means for placing said clutch in a partly disengaged position so as to prevent a forward drive through the clutch and retain a reverse drive therethrough, said clutch when so released from a forward drive relationship, upon deceleration of said drive shaft, forming a connection for drive from the driven shaft to the drive shaft without changing its direction of rotation when said driven shaft is the driver, and means for holding said clutch in said partly disengaged position.

8. In a change speed transmission, the combination of a drive shaft, a driven shaft, change speed gearing between said shafts, an overrunning clutch for connecting said shafts with said gearing, an overrunning clutch for connecting said drive and driven shafts directly together, said overrunning clutches when not fully engaged, upon deceleration of the drive shaft, permitting the drive of said drive shaft through said gearing or through said driven shaft by the driven shaft without changing the direction of rotation of said drive shaft when said driven shaft is rotating faster than said drive shaft.

9. In a change speed transmission, the combination of a drive shaft, a driven shaft, change speed gearing between said shafts, an overrunning clutch for connecting said shafts with said gearing, an overrunning clutch for connecting said drive and driven shafts directly together, said overrunning clutches when not fully engaged permitting the drive of said drive shaft through said gearing or through said driven shaft by the driven shaft without changing the direction of rotation of said drive shaft, said overrunning clutches acting to lock the driven shaft against movement when the drive shaft is not being driven and there is a tendency to move the vehicle backwards down hill.

10. In a change speed gearing, the combination of a drive shaft, a driven shaft, change speed gearing between said shafts, a jaw clutch for connecting said gearing with said shafts, a jaw clutch for connecting said drive shaft directly with said driven shaft, said jaw clutches being of the type in which the driver part of said clutch may overrun the driven part when the speed of the drive part exceeds that of the driven part, said jaw clutches when not fully engaged being in a partially engaged position so that the driven member of each clutch may drive the drive member thereof without changing the direction of rotation of said drive member if the speed of the drive member is below that of the driven member.

11. In a variable speed transmission, the combination of a drive shaft, a driven shaft, change speed gearing between said shaft, an overrunning jaw clutch for connecting said shafts with said gearing, an overrunning jaw clutch for connecting said shafts together for direct drive, a governor operable through connection with said driven shaft, yieldable connections between said governor and each of said clutches, a manually operated member, a yieldable connection between said member and the jaw clutch for connecting said shafts together for direct drive, and means for limiting the extent of movement of said yieldable connection to limit the movement of the jaw clutch to a partially disengaged position, said last named jaw clutch when partially engaged permitting the drive of said drive shaft by said driven shaft when said driven shaft is rotating faster than said drive shaft.

12. In a change speed transmission, the combination of a drive shaft, a driven shaft, change speed gearing between said shafts, a clutch for connecting said shafts together through said gearing, a clutch for connecting said drive and driven shafts directly together, speed responsive means for actuating said clutches, means for locking said shafts in constant ratio with said gearing, and a latch controlled by said locking means for preventing operation of said clutch for connecting said drive and driven shafts directly together.

13. In a change speed transmission, the combination of a drive shaft, a driven shaft, change speed gearing between said shafts, a clutch for connecting said shafts together through said gearing, a clutch for connecting said drive and driven shafts directly together, speed responsive means for actuating said clutches, a reverse gear connection between said shafts, manually operated means for controlling said reverse gear connection, and a latch controlled by said last named means for preventing operation of both of said clutches while in neutral.

14. In a change speed transmission, the combination of a drive shaft, a driven shaft, change speed gearing between said shafts, means for operatively connecting said gearing with said shafts, an overrunning jaw clutch for connecting said drive and driven shafts directly together, means for placing said clutch in a partly disengaged position so as to prevent a forward drive from the drive to the driven shafts through said clutch and to retain a reverse drive from the driven to the drive shaft therethrough, said clutch when so released from a forward drive relationship, upon deceleration of said drive shaft, permitting the drive of said drive shaft by said driven shaft without changing the direction of rotation of said drive shaft when said driven shaft is the driver, and means for retaining said clutch in said partly disengaged position.

15. In a change speed transmission, the combination of a drive shaft, a driven shaft, an auxiliary shaft, change speed gearing between said shafts for low and second speed gear ratio including an automatic one way clutch between said auxiliary shaft and the gearing between said auxiliary shaft and the driven shaft for the second speed gear ratio and an automatic one way clutch between said driven shaft and the low ratio gear thereon, jaw clutch mechanism of the overrunning type for establishing second speed ratio through said gearing, and jaw clutch mechanism of the overrunning type for connecting said drive and driven shafts together for direct drive.

16. In a variable speed transmission, the combination of a drive shaft, a driven shaft, an auxiliary shaft, change speed gearing between said shafts for low and second speed gear ratio and a reverse gearing connection between said auxiliary and driven shafts including a shiftable gear, a clutch for connecting said shafts together through said gearing, a clutch for connecting said drive and driven shafts directly together, speed responsive means for actuating said clutches, means for locking said shafts in constant second speed ratio with said gearing, a latch controlled by said locking means for preventing operation of said clutch for connecting said drive and driven shafts directly together, control mechanism for moving said shiftable reverse gear to reverse position, a latch for preventing operation of said clutches when said reverse gear is in reverse position, and means operated by said control mechanism for controlling said last named latch.

17. In a variable speed transmission, the combination of a drive shaft, a driven shaft, an auxiliary shaft, change speed gearing between said shafts for low and second speed gear ratio and a reverse gearing connection between said auxiliary and driven shafts including a shiftable gear, a clutch for connecting said shafts together through said gearing, a clutch for connecting said drive and driven shafts directly together, speed responsive means for actuating said clutches, clutch mechanism for connecting said gearing for the low gear ratio, means for locking said gearing in second, a latch controlled by said locking means for preventing operation of said clutch for connecting said drive and driven shafts directly together, a latch for preventing operation of both of said speed responsive actuated clutches when said gearing is in reverse, a cam for selectively operating said locking means and said last named latch, and means associated with said cam for moving said shiftable reverse gear to reverse position while releasing the clutch for connecting said gearing for the low gear ratio.

18. In a variable speed transmission, the combination of a drive shaft, a driven shaft, change speed gearing connecting said shafts together for low and second speed gear ratios, a free wheeling connection between said low speed gearing and said driven shaft, a free wheeling connection for said second gear ratio, clutch mechanism for establishing second speed ratio through said gearing, speed responsive clutch mechanism for connecting said drive and driven shafts together for direct drive, said last named clutch mechanism adapted to overrun when the speed of the driver exceeds that of the driven part being engaged but being constantly engaged for the drive of the driver part by the driven part to prevent free wheeling of the drive shaft relative to the driven shaft.

19. In a change speed transmission, the combination of a drive shaft, a driven shaft, change speed gearing between said shafts, an overrunning clutch for connecting said shafts with said gearing, an overrunning clutch for connecting said drive and driven shafts directly together, means for placing said clutches in partly engaged positions preventing forward drive through said clutches and maintaining a reverse drive therethrough, and means for holding said clutches in said partly engaged positions.

OSCAR H. BANKER.